United States Patent Office 2,793,053
Patented May 21, 1957

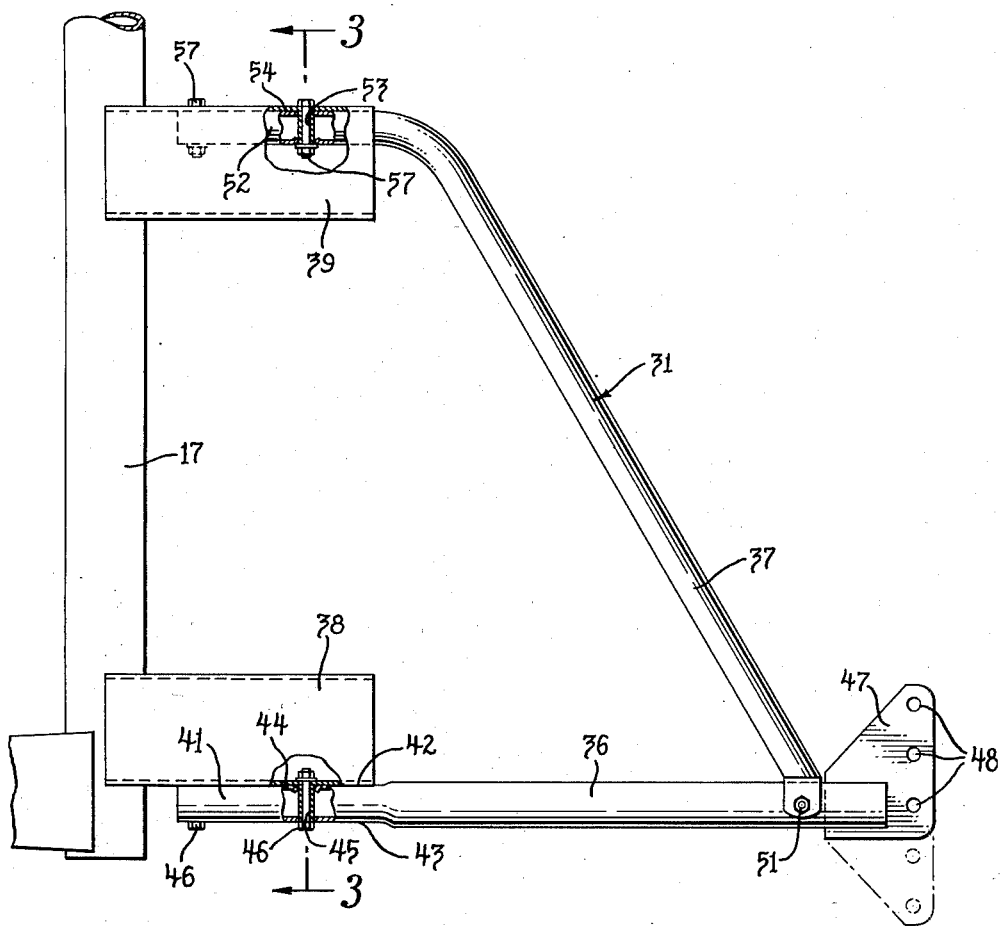
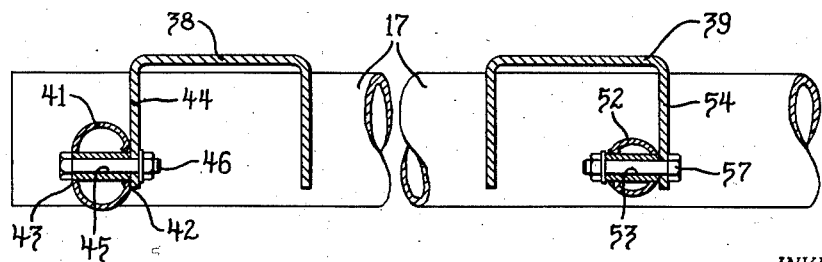
Fig. 2
Fig. 3
INVENTORS.
WILLIAM A. WATHEN &
HOWARD G. THOMPSON
ATTORNEYS.

2,793,053
WAGON HITCH FOR HARVESTERS

William A. Wathen, Detroit, and Howard G. Thompson, Livonia, Mich., assignors to Massey-Harris-Ferguson, Inc., Racine, Wis., a corporation of Maryland Application August 12, 1955, Serial No. 527,918

3 Claims. (Cl. 280—460)

The present invention relates to hitches and more particularly to a hitch arrangement for connecting a trailing vehicle to a tractor-implement unit of the type in which the implement is adapted to be mounted at one side of the tractor.

It is frequently desirable to pull a wagon with implements such as corn pickers, forage harvester and hay balers so that the harvested product may be conveyed directly from the harvester to the wagon.

In pulling a wagon with a tractor and side mounted implement unit, it is desirable to locate the wagon hitch so that the resistance of the wagon does not exert an unbalanced load and produce a turning effect on the propelling unit.

To avoid an unbalanced load, the location of the point to which the wagon is to be hitched is dictated in large measure by the transverse spacing of the drive or traction wheels of the unit, which may be formed either by both of the tractor wheels or by one of the tractor wheels and an implement supporting wheel at one side of the tractor as disclosed, for example, in the patent to Robert W. King, U. S. 2,668,597. A change from one type of driving arrangement to another will vary the transverse spacing of the drive wheels and make it desirable to provide a hitch structure which may be used with either drive arrangement.

A general object of this invention is to provide a hitch structure which may be readily attached to a tractor and side mounted implement unit for pulling a trailing vehicle.

A further object of this invention is to provide a hitch structure for connecting a wagon to a tractor and side mounted implement unit so that the resistance of the trailing vehicle does not tend to turn the unit from its normal direction of travel.

A further object of this invention is to provide a hitch structure for pulling a trailing vehicle which may be used with a tractor and side mounted implement unit employing either of the drive means outlined above.

A further object of this invention is to provide a hitch structure for pulling a trailing vehicle with a tractor and side mounted implement unit, the hitch structure being simple and inexpensive and readily modified to meet draft requirements created by different types of drive arrangements of the unit.

These and other objects and advantages are attained by the present invention, various novel features of which will be apparent from the description and drawings of a preferred embodiment, and will be more particularly pointed out in the claims.

In the drawings:

Fig. 2 is an enlarged plan view of the hitch structure shown in Fig. 1, with parts broken away.

Fig. 3 is a further enlarged sectional view taken on line 3—3 in Fig. 2.

Figure 1:
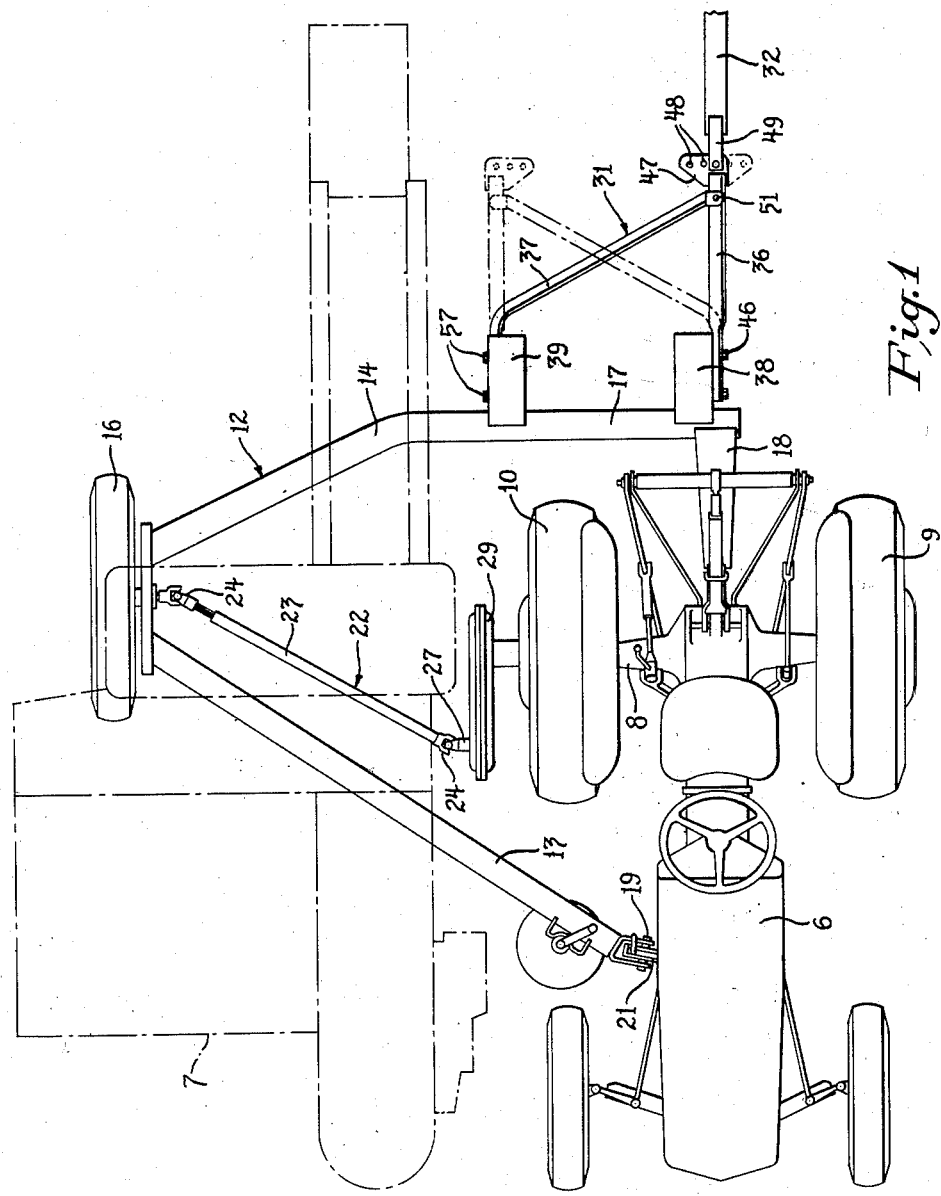
Fig. 1 is a plan view of a tractor and side mounted implement unit embodying the hitch structure of the invention.

As illustrated in Fig. 1 a tractor-implement unit comprises a tractor 6 to which an implement 7 has been coupled in side by side relation.

The tractor is of conventional four wheel type and includes an engine for delivering power to axles supported within a housing 8 and mounting a left traction wheel 9 and a right traction wheel 10.

The implement 7 may be any one of the side mounted type such as a corn picker, combine, forage harvester or, as illustrated in Fig. 1, a hay baler, the various components of which are supported on a generally V-shaped frame structure 12 having a forward frame member 13 and a rearward frame member 14 joined together at ends remote from the tractor to afford a support for an implement wheel 16. The rearward frame member 14 has a transversely extending portion 17 rigidly mounting a forwardly extending tongue 18 which may be detachably connected to the drawbar or hitch point on the tractor 6 in any conventional manner. The free end of the forward frame member 13 is detachably connected by a pin 19 to a bracket 21 rigidly mounted on one side of the tractor. By connecting the baler 7 in this manner the inboard side of the baler is supported relative to the ground by the wheels of the tractor and the outbard side of the baler is supported on the implement wheel 16.

Propelling motion of the tractor-implement unit is ordinarily afforded by delivery of power from the tractor engine to the rear wheels 9 and 10 of the tractor. Under some operating conditions, however, the resistance of the implement wheel 16 may impose an unbalanced load on the tractor causing it to turn from its normal line of travel toward the side on which the implement 7 is mounted. To overcome the turning effect of the tractor, power ordinarily delivered to the right tractor wheel 10 may be transmitted to the implement wheel 16 by means of an auxiliary drive mechanism 22 comprising a shaft 23 drivingly connected at opposite ends by universal couplings 24 to the axle of the implement wheel 16 and to an output shaft 27 of a gear train unit 29 receiving rotational power from the axle structure at one side of the tractor. By means of the auxiliary drive mechanism 22, a portion of the tractor engine power is transmitted to the left tractor wheel 9 and the remainder of the power may be transmitted to the implement wheel 16 so that the propelling power is delivered to wheels disposed at opposite sides of the entire tractor-implement unit. Although the auxiliary drive mechanism is desirable to overcome the turning tendency of the tractor its use is not demanded for successful operation of the tractor-implement unit but may be installed at the option of the user.

Referring to Figs. 1 and 2, a hitch structure 31 is provided for attachment at its front end to laterally spaced elements on the unit. The rear end of the structure 31 is provided with a mounting which is laterally offset to one side of the structure 31. More specifically, the hitch 31 for connecting the tongue 32 of a trailing vehicle such as a wagon (not shown) to the tractor-implement unit includes a generally fore and aft arranged drawbar member 36 and a strut member 37 detachably connected together and to a pair of hitch supporting elements, in the form of brackets 38 and 39, rigidly mounted in spaced relation to the transverse portion 17 of the implement frame. As shown in Fig. 1, bracket 38 is positioned rearwardly and approximately centrally, in a lateral direction, of the tractor wheels 9 and 10 and bracket 39 is positioned rearwardly and approximately midway between the left tractor wheel 9 most remote from the implement and the implement wheel 16.

Referring to Figs. 2 and 3, a forward end portion 41 of drawbar member 36 is provided with similar, oppositely facing sides 42 and 43, which are adapted to abut a complementary side surface of a web 44 on bracket 38. Drawbar member 36 is rigidly and detachably connected to frame member 17 by a pair of bolts 46 passing through spaced apertures 45 in the end portion 41 and aligned with similar apertures in bracket 38. As shown in Fig. 2 the drawbar member 36 extends rearwardly from the bracket 38 and the free end portion has a mounting element 47 to which a trailed vehicle is attachable. This mounting takes the form of a rigidly mounted triangular frame or hitch plate 47 which extends horizontally to one side of the drawbar member. The hitch plate 47 is provided with three equally spaced apertures 48, one being positioned longitudinally of the drawbar member 36 and the others being spaced to one side thereof for selectively receiving a pin of the complementary hitch element 49 on the wagon tongue 32.

The drawbar member 36 and hitch plate 47 may be disposed as shown in the full line position in Fig. 2, or drawbar member 36 may be rigidly attached to bracket 38 with side portion 43 abutting the side of web 44 to dispose hitch plate 47 in the dot-dash line position. These two positions of the hitch plate 47 afford a total of five different attaching points or stations, formed by apertures 48, which are available for connecting a wagon to the baler 7.

In either of its selected positions, the drawbar member 36 is vertically fixed by the longitudinally spaced bolts 46 and is horizontally braced by the strut member 37 detachably connected at one end to the drawbar member 36 by means of a bolt 51 and extends forwardly and laterally toward the bracket 39 on the implement frame 14. The forward end of strut member 37 is bent forwardly to present an attaching portion 52 having a pair of apertures 53 corresponding in size and spacing to the apertures 45 in the drawbar member 36. As shown in Figs. 2 and 3, the attaching portion 52 is detachably connected in vertically fixed relation to a web 54 of bracket 39 by means of a pair of bolts 57 in transverse alignment with drawbar bolts 46.

Referring now to Fig. 1, when propelling power is delivered to the rear wheels 9 and 10 of the tractor, the hitch structure 31 may be positioned with the drawbar member 36 extending rearwardly from bracket 38. This positions the hitch plate 47 rearwardly and approximately midway between the propelling wheels 9 and 10 so that the resistance of the attached wagon does not impose an unbalanced load on the tractor-implement unit. Furthermore, to enable a wagon to trail in proper relation to the implement 7 or to laterally shift the wagon resistance, the hitch plate 47 may be disposed in one of the two positions illustrated in Fig. 2 and the wagon tongue 32 may be connected either in longitudinal alignment with drawbar member 36 or to one side thereof.

When the auxiliary drive mechanism 22 is used to distribute the propelling power to the tractor wheel 9 and implement wheel 16, it is desirable to locate the hitch plate 47 rearwardly and approximately midway of the two propelling wheels 9 and 16. To accomplish this, the entire hitch mechanism 31 may be detached from the tractor-implement unit by removing bolts 46 and 57 and by connecting the drawbar member 36 to bracket 39 and the strut member 37 to bracket 38 as shown in dot-dash line in Fig. 1. In this position the hitch plate 47 is disposed generally centrally and rearwardly of the propelling wheels and may be positioned to extend to either side of the drawbar member 36 as previously described.

It should be understood that the invention is not limited to the particular details of design and construction described and that the invention also includes such other forms and modifications as are embraced within the scope of the appended claims.

Having shown and described our invention, we claim:

1. In a hitch structure for coupling a trailing vehicle to a tractor and side mounted implement unit wherein the tractor has a pair of rear ground engaging wheels and the implement has a ground engaging wheel at one side of said implement remote from said tractor, the combination of a first bracket mounted on said unit substantially midway of said tractor wheels, a second bracket mounted on said unit in laterally spaced relation to said first bracket and substantially midway of said implement wheel and the one of said tractor wheels most remote from said implement wheel, an elongated drawbar member, a strut member detachably connected to an intermediate part of said drawbar member, a pair of attaching portions on said drawbar member and strut member, respectively, means for detachably connecting said attaching portion of said drawbar member in vertically fixed relation to a selected one of said brackets, additional means for detachably connecting said attaching portion of said strut member in vertically fixed relation to the other of said brackets, and a hitch element rigidly mounted on said drawbar member and presenting a plurality of hitch stations for selectively receiving a complementary hitch element of a trailing vehicle, one of said hitch stations being disposed longitudinally of said drawbar member and the other of said stations being disposed to one side thereof.

2. In a hitch structure for coupling a trailing vehicle to a tractor and side mounted implement unit wherein the tractor has a pair of rear ground engaging wheels and the implement has a ground engaging wheel at one side of said implement remote from said tractor, the combination of a first bracket mounted on said unit between said tractor wheels, a second bracket mounted on said unit in laterally spaced relation to said first bracket between said implement wheel and the one of said tractor wheels most remote from said implement wheel, an elongated drawbar member having a hitch element at one end and a coupling portion at the other end thereof, said coupling portion presenting a pair of similar oppositely facing bracket receiving portions, means for detachably connecting said drawbar member to a selected one of said brackets with a selected one of said bracket receiving portions in abutment with said one bracket, an elongated strut member detachably connected at opposite ends to an intermediate part of said drawbar member and to the other of said brackets, respectively, said hitch element having a plurality of hitch receiving stations for selectively receiving a complementary hitch element of a trailing vehicle, one of said hitch stations being disposed longitudinally of said drawbar member and the other of said stations being disposed to one side thereof.

3. In a hitch structure for coupling a trailing vehicle to a tractor and side mounted implement unit wherein the tractor has a pair of ground engaging wheels and the implement has a ground engaging wheel at one side of said implement remote from said tractor, the combination of a first hitch element on said unit substantially midway of said tractor wheels, a second hitch element laterally spaced from said first hitch element and substantially midway of said implement wheel and the one of said tractor wheels most remote from said implement wheel, a rigid hitch structure having a pair of laterally spaced portions at its front end, one of said portions being detachably connected to a selected one of said hitch elements and the other of said portions being connected to the other of said hitch elements, and a mounting member rigidly connected to the rear end of said hitch structure at one side of the latter for receiving a complementary hitch element on a trailing vehicle.

References Cited in the file of this patent

UNITED STATES PATENTS

| | | |
|---|---|---|
| 1,268,808 | Gamble | June 4, 1918 |
| 2,311,859 | Oehler | Feb. 23, 1943 |
| 2,335,942 | Hyman | Dec. 7, 1943 |
| 2,494,388 | Heth | Jan. 10, 1950 |
| 2,707,643 | Nelson | May 3, 1955 |

FOREIGN PATENTS

| | | |
|---|---|---|
| 458,263 | Great Britain | Dec. 16, 1936 |